April 15, 1952 — F. W. SMITH — 2,592,965

COMPUTING DEVICE

Filed Nov. 27, 1950

Frank W. Smith
INVENTOR.

BY Clarence A. O'Brien and Harvey B. Jacobson
Attorneys

Patented Apr. 15, 1952

2,592,965

UNITED STATES PATENT OFFICE 2,592,965

COMPUTING DEVICE

Frank W. Smith, Adair Village, Oreg.

Application November 27, 1950, Serial No. 197,679

4 Claims. (Cl. 235—89)

This invention relates to new and useful improvements in indicating and computing devices and the primary object of the present invention is to provide a device for computing steel square settings as applied to carpentry and the design of rafters in frame house construction.

Another important object of the present invention is to provide a computing device for indicating the length of rafter required for a given pitch and for also indicating the cut required for framing two structural members.

A further object of the present invention is to provide a computing device of the aforementioned character that is extremely small and compact in structure to permit the same to be conveniently carried in a user's pocket.

A still further aim of the present invention is to provide a computing device that is simple and practical in construction, strong and reliable in use, inexpensive to produce, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
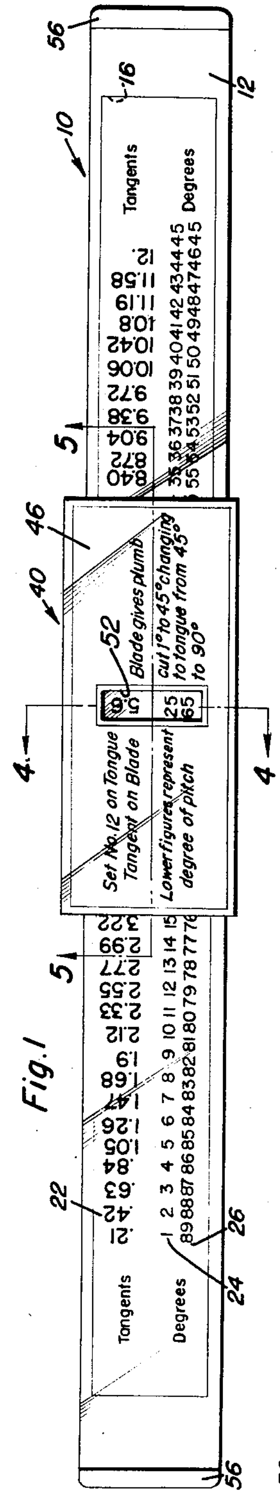
Figure 1 is a plan view of the present invention.
Figure 2:
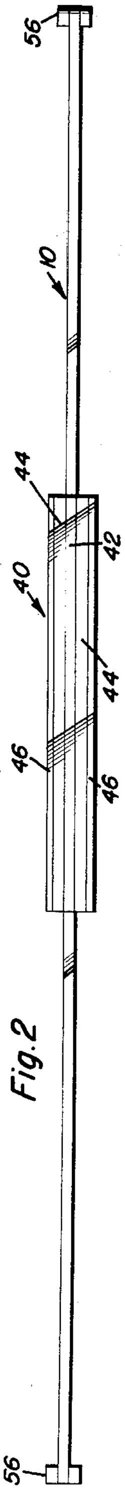
Figure 2 is a side view of Figure 1.

Referring now to the drawings in detail, wherein for the purpose of illustration, there is disclosed a preferred embodiment of the present invention, the numeral 10 represents an elongated rule composed of two flat transparent plastic strips 12 and 14 whose inner faces are provided with registering grooves 16 and 18. An indicia bearing strip 20 is mounted in the grooves 16 and 18 and the inner faces of the strips 12 and 14 are secured together by cement or the like to retain the strips 12 and 14 in superimposed relation.

One face of the strip 20 is provided with three correlated rows of indicia or numerals 22, 24 and 26. The row of numerals 22 is designated, at each end, by the word "tangents" and the rows of numerals 24 and 26 are designated, at each end, by the word "degrees."

The other face of the strip 20 is provided with six correlated rows of indicia or figures 28, 30, 32, 34, 36 and 38. The row of figures 30 is designated by the words "common rafter," the row of figures 32 is designated by the words "octagon hip," and the row of figures 34 is designated by the words "hip or valley."

A plastic slide 40 embraces the rule 10 and is laminated to include a pair of parallel side strips 42, a pair of rectangular strips 44 and a pair of outer transparent walls 46. The strips 42 are equal in thickness to the rule 10 and include inner edges that ride against the side edges of the rule 10.

The strips 44 are wider than the rule 10 and overhang the side edges of the rule and are secured by cement or the like to the strips 42. The outer walls 46 are equal in width to the strips 44 and are secured by cement or the like to the strips 44.

Figure 3:
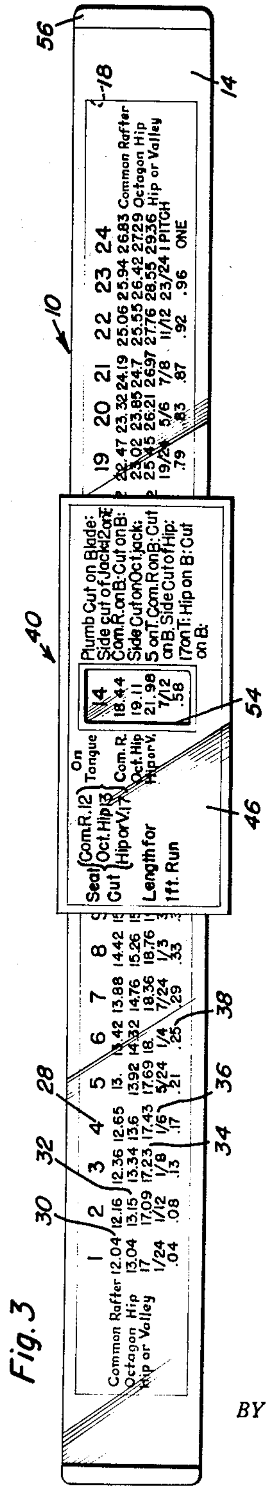
Figure 3 is a bottom plan view of Figure 1.
Figure 5:
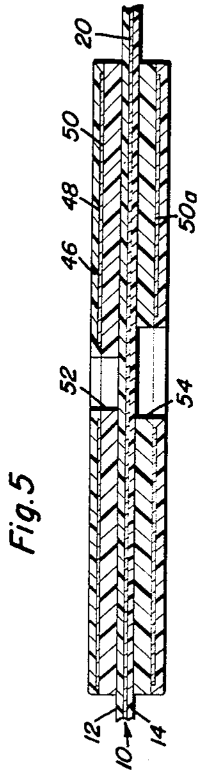
Figure 5 is an enlarged longitudinal vertical sectional view taken substantially on the plane of section line 5—5 of Figure 1.
Figure 4:
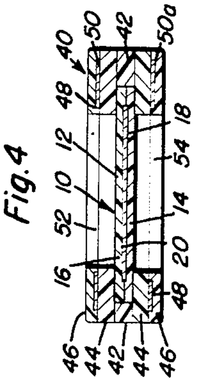
Figure 4 is an enlarged transverse vertical sectional view taken substantially on the plane of the section line 4—4 of Figure 1.

The inner faces of the walls 46 are provided with grooves or recess 48 that receive indicia bearing sheets 50 and 50$a$ having the instruction notations on their outer faces as shown in Figures 1 and 3. The slide 40 is provided with transverse registering openings 52 and 54.

Stops or abutments 56 are provided on the ends of the rule 10 and retain the slide on the rule. The stops are disposed sufficiently far from the first and last figures in the rows of figures to permit the openings 52 or 54 to register with the first and last numerals or figures in any row.

The side of the rule containing the rows of figures 28, 30, 32, 34, 36 and 38 is referred to as the "rafter scale" and is divided into 24 sections. The sections represent from 1 to 24 inch rise to a foot run. The first row of figures 28 indicate the rise and the rows 30, 32, and 34 represent in inches the lengths the common rafter, octagon hip and the common hip or valley. The fractional numbers in the row 36 designate the pitch or proportion of the rise of the roof to that of the span, and the row of figures 38 is the decimal fractions to one-hundredth of an inch of the figures in row 36.

In practical use of the rafter scale to determine the cuts and lengths for a given pitch, the slide is moved until the opening 54 registers with the given pitch, for example, a 7/12 pitch on row 36, as shown in Figure 3. The figure 14 appears in the window opening 54 from row 28. The following information is then available: (*a*) the length for one foot runs is 18.44 inches; (*b*) by setting the tongue of a steel square on 12 and the blade on 14 the cut can be determined remembering that the tongue gives the seat cut and the blade gives the plumb cut. The same information is available for octagon hip and hip or valley rafters in the same manner.

In practical use of the scale or rows 22, 24 and 26 for framing two pieces at a given angle, for example, an angle of 130 degrees as shown in Figure 1, the slide is moved until the opening 52 registers with the numeral 65 in row 26 since the mitre will bisect the given angle, and the plumb cut will be one-half of 130 degrees or 65 degrees. The strip 12 divided by the tangent is then observed through the opening 52 on the row 22 as 5.6. This is the decimal equivalent of 5 and 7/12. Therefore 12 on the tongue on the steel square and 5 7/12 on the blade will determine the mitre and the cut will be made on the blade.

If the degree of pitch is less than 45 degrees then the figures in row 24 are employed without taking one-half the degree of pitch. This procedure is also followed if the degree of pitch is less than 90 degrees but greater than 45° and the row 26 is used.

Having described the invention, what is claimed as new is:

1. A computing device for carpenters comprising an elongated rigid rule having flat first and second faces, two correlated rows of figures on the first face of said rule to indicate the cut required for framing two structural members at a predetermined angle, a slide considerably shorter than the rule, said slide embracing the rule and including first and second walls in registry with the first and second faces of said rule respectively, one of said walls having an opening for selectively registering with one figure of each row, and stops at the ends of the rule, said slide being slidable on the rule between the stops.

2. A computing device for carpenters comprising an elongated rigid rule having flat first and second faces, at least two correlated rows of figures on the second face of said rule to indicate the length of rafter for a given pitch, stops at the ends of said rule, and a slide embracing the rule and slidable between the stops at the ends of the rule, said slide including first and second walls in registry with the first and second faces of said rule respectively, one of said walls having an opening for selectively registering with one figure of each row, said rule being considerably longer than the slide and including a pair of superimposed transparent strips having inner faces, said inner faces of said strips having registering channel shaped grooves therein, and an indicia bearing strip having the rows of figures thereon, said indicia bearing strip being mounted in said grooves.

3. A computing device for carpenters comprising an elongated rule having flat first and second faces, two correlated rows of figures on the first face of said rule to indicate the cut required for framing two structural members at a predetermined angle, and a slide considerably shorter than the rule, embracing the rule and including first and second walls in registry with the first and second faces of said rule respectively, one of said walls having an opening for selectively registering with one figure of each row, said slide including a laminated member including outer transparent laminations having inner grooved faces, and indicia bearing strips in the grooves in the inner faces of said transparent laminations, said slide also including a pair of registering internal grooves extending throughout its length and receiving the side edges of the rule.

4. A computing device for carpenters comprising an elongated rigid rule composed of two juxtapositioned strips of transparent plastic material having inner faces formed with registering channeled grooves and an indicia bearing strip secured in said grooves, stops at the ends of the rule, and a laminated slide mounted on said rule for sliding movement between said stops, said slide including a pair of spaced parallel strips contacting the side edges of the rule and being of a width equal to the thickness of the rule, a pair of substantially rectangular strips extending across the rule and secured to said parallel strips, a transparent wall overlying one of said rectangular strips and being secured thereto, said transparent wall having an inner face with a recess therein, and another indicia bearing strip secured in said recess and coacting with the indicia on the first-mentioned indicia bearing strip.

FRANK W. SMITH.

REFERENCES CITED

The following references are of record in the file of this patent:

UNITED STATES PATENTS

| Number | Name | Date |
|---|---|---|
| 778,790 | Merrill | Dec. 27, 1904 |
| 1,152,028 | Knoblock | Aug. 31, 1915 |
| 1,166,675 | Griffin | Jan. 4, 1916 |

FOREIGN PATENTS

| Number | Country | Date |
|---|---|---|
| 602,802 | Great Britain | June 3, 1948 |